United States Patent

[11] 3,624,005

| [72] | Inventor | Yves Georges Godron<br>Paris, France |
|---|---|---|
| [21] | Appl. No. | 218,844 |
| [22] | Filed | Aug. 23, 1962 |
| [45] | Patented | Nov. 30, 1971 |
| [73] | Assignee | Compagnie de Saint-Gobain<br>Neuilly-sur-Seine, France |
| [32] | Priority | Aug. 29, 1961 |
| [33] | | France |
| [31] | | 871811 |

[54] GRAPHITE-GLASS COMPOSITIONS AND METHOD OF MAKING SAME
6 Claims, No Drawings

[52] U.S. Cl. .................... 252/506,
310/252, 310/253, 106/54, 106/56, 252/508,
264/105
[51] Int. Cl. .................... H01b 1/06,
H01c
[50] Field of Search ........... 252/506,
507, 508, 509; 23/209.1; 106/47, 56; 264/105

[56] References Cited
UNITED STATES PATENTS

| 2,442,860 | 6/1948 | Richardson | 65/305 X |
|---|---|---|---|
| 2,886,476 | 5/1959 | Dumesnil et al. | 252/502 X |
| 2,482,933 | 9/1947 | Queneau | 117/223 |
| 2,556,616 | 6/1951 | Ellis | 252/506 X |
| 2,106,578 | 1/1938 | Schwartzwalder et al. | 252/509 X |
| 2,554,373 | 5/1951 | Max-Claudet | 106/49 X |
| 2,875,076 | 2/1959 | Suchow | 106/47 X |
| 2,460,356 | 2/1949 | Kreidl et al. | 65/66 |

FOREIGN PATENTS

| 1,062,401 | 7/1959 | Germany | 65/18 |

*Primary Examiner* — John D. Welsh
*Attorneys* — Dale A. Bauer, John L. Seymour and Bauer and Seymour ABSTRACT: Compositions which can be shaped, machined, polished, cut, which have the same level of conductivity as graphite even for high contents of glass, which resist oxidation much better than graphite, and which have good water resistance, are made by impregnating graphite with glass which makes with graphite, when molten, an interior angle less than 45°. These compositions are superior to both glass and graphite for many uses. The invention reveals a group of glasses which have the property of wetting graphite. These compositions are useful as electric motor brushes, bearings and rods, bars, and plates.

GRAPHITE-GLASS COMPOSITIONS AND METHOD OF MAKING SAME

This invention relates to graphite-glass compositions of matter having properties which arise from the combination and which are different from those of either graphite or glass.

It has heretofore been proposed to make composites of glass and graphite by impregnating a porous graphite body with molten glass, usually under pressure or vacuum. The acceptance of the glass was limited to special types of graphite of open pore structure, and even so the quantity of glass that could be introduced was limited, the impregnation was uneven, and the process was defective because of the inadequate pressures which could be applied. The utility of the impregnated object was limited by the degree to which the glass could penetrate the pores and canals of the graphite. The preparation of duplicate pieces was difficult or impossible, and differences in quality could not be introduced to meet different needs.

It is an object of this invention to prepare graphite-glass composites to specification, to provide for duplication of objects, uniformity of composition, maintenance of superior qualities, and variation of properties. The invention includes the new materials and the method of making them.

The objects of the invention are accomplished generally speaking by what is in effect a dispersion of graphite particles agglomerated by a vitreous substance in which the vitreous substance wets the graphite and becomes sufficiently fluid for practically filling the space between the graphite particles at a temperature sufficiently low to avoid any substantial oxidation of the graphite. A method of making such a graphite-glass composite comprises mixing finely divided graphite with finely divided glass, heating the mixture to a temperature at which the glass is sufficiently fluid for practically filling the space between the graphite particles, applying pressure and cooling the composite. The composites are agglomerates of graphite and glass in which the space between the graphite particles is filled by a glass matrix.

It has heretofore been believed that glass does not wet graphite, but I have discovered that some glasses which have a viscosity below $10^4$ poises at 700° C., will wet graphite. The ability of a particular vitreous composition to wet graphite may be determined by placing a gob of glass on a smooth and small graphite plate disposed horizontally, allowing the drop to sink to equilibrium and measuring the angle interior to the drop comprised between the superior horizontal plane of the plate and the planes tangent to the surface of the drop at the circumference of contact of said surface with said horizontal plane. Said angle will be hereinafter designated as the "interior contact angle with graphite." If the interior contact angle is less than 45° the glass is said to wet graphite. Practically, the glass has still better properties when the interior contact angle is less than 15°. The test thus defined is generally done in the air at a temperature less than the temperature of combustion of graphite which is on the order of 450° C.

Examples of useful vitreous compositions which meet these requirements are lead borates, lead borosilicates, and complex borosilicates such as the following (the figures given being percent by weight):

1. $SiO_2$:26.40—$B_2O_3$:20.40—$Al_2O_3$:2.20—$BaO$:17.20—$CaO$:3.20—$ZnO$:6.70—$Na_2O$:17.50—$K_2O$:1.15—$Li_2O$:5.10
2. $SiO_2$:16.80—$Al_2O_3$:1.15—$Na_2O$:0.14—$K_2O$:0.03—$B_2O_3$:9.25—$PbO$:72.20
3. $SiO_2$:5.60—$Al_2O_3$:0.40 $Na_2O$:0.06—$K_2O$:1.12—$B_2O_3$:18.75—$PbO$:73.35

For preferred results the glasses used should be in particle sizes less than about 30 mu. as this aids in the mixing and in the manufacture of the agglomerates. The graphite of commerce is useful but for preferred results it should be low in amorphous carbon content and the particles should be less than about 50 mu. in size.

The glass and graphite may be mixed dry, by any one of numerous mixing machines, and as intimately and uniformly as possible, and in proportions from 10 to 75 parts by volume of graphite to 90 to 25 parts by volume of glass respectively. Any method of agglomeration may be employed but it is advantageous to proceed in the following way:

The mixture of glass and graphite particles is compressed at room temperature in a mold, for instance at 300 kg./sq. cm. to make a coherent shape which may be handled. It is transferred to a steel mold which has been heated to agglomerating temperature, e.g. 450° C. which is maintained until the shape has attained the same temperature, after which the shape is put under pressure in the mold, this pressure being conveniently of the same order as in the initial molding operation. The heating of the mold is stopped and the assembly is cooled, under continued pressure, until the temperature has fallen below the corresponding to the maximum point reached on the complete thermal curve of the (Morey: "The properties of Glass" 1954 p. 165), which is about 350° C. for lead borate glass. The object can then be demolded without adhering to the metal and cooled to room temperature by any convenient method including exposure to room temperature. This method prepares all sorts of shapes successfully, including rods, bars, plates and disks, of which disks of 30 to 120 mm. diameter may be mentioned.

These new objects can be machined without using diamond edged tools and they will take a specular polish by ordinary polishing methods as applied to glass. Their coefficients of expansion are very low, being equal or only slightly superior to that of graphite, for compositions containing not over 75 to 80 percent of glass by volume. Their resistance to water is excellent. They conduct electricity at the same level as graphite even for high contents of glass. Their resistance to oxidation is three to five times better than that of graphite.

Some of the properties of the graphite-glass agglomerate vary with composition. Porosity increases with the content of graphite, is determinable for a graphite content of 60 to 65 percent, but disappears at a lower content. Thermal diffusivity increases with graphite content and is higher than that of glass for a content of as little as 10 percent of graphite. Their mechanical properties, such as resistance to compression, rupture, and abrasion, increases with glass content, which commends their use as brushes for electric motors and dynamos. For instance, and agglomerate of lead borate glass and graphite, of 78 percent by volume glass, has compression resistance of about 27 kg./sq. cm., which is higher than graphite, and wear resistance which is typified by a motor brush which exhibited a score by diamond point only three-tenths of that made under the same conditions in a graphite brush. As to wear resistance, the more resistant are those which have the larger glass content, and this resistance is much superior to graphite. The coefficient of friction is very low, especially against brass, and it is particularly noteworthy that there is little difference between the friction at starting and that during running, which makes these objects highly useful for certain types of bearings.

The following example illustrates the invention.

EXAMPLE I

Two hundred grams of a mixture of graphite (99.5 percent C) and lead borate glass containing 12 percent $B_2O_3$ were mingled under the following conditions: 53 parts by volume of the graphite powder were intimately mingled with 47 parts of the lead borate glass. The size of the graphite particles was from 1 to 10 mu. and the size of the glass particles was less than 30 mu. A few drops of glycerine were added as a lubricant. The mixture was compressed at room temperature into small disks 30 mm. in diameter and 15 mm. thick at a pressure of 300 kg./sq. cm.

A second mold was prepared, having a cylindrical chamber 31 mm. in diameter into which a cylindrical piston fitted. The mold was heated to 450° C. and kept at that temperature by a thermostat. The disk from the first mold was put in the second and left there 15 minutes to heat it. A pressure of 300 kg./sq. cm. was applied, the heating of the mold was stopped and the mold cooled to 350° C. at which the mold was opened and the form removed.

The product was a disk of density 3.95 of brilliant aspect and homogeneous constitution. This disk could be machined to exact size to provide a test piece. The hardness of the piece by sklerometer (width of ray) was ascertained by a diamond point under 40 g. load and found to be 63, whereas it is 100 for a graphite dynamo brush. Its resistance to water, measured by the loss of weight per unit of surface of a test piece, after 24 hours in distilled water at 80° C. was 0.6 mg./sq. cm. Its coefficient of friction on starting, measured under 1.5 kg./sq. cm. without lubricant on brass and steel, the surfaces having been polished with sandpaper, and with rouge or felts, were respectively 0.086 (brass) and 0.157 (steel). The resistance of the piece to oxidation, measured by loss of weight, after heating in a furnace at 350° C. for 2 hours, was excellent, the loss of weight being practically zero. The open porosity of the piece, determined by weighing the dry test piece before and after saturation with water, stated by volume, was 0.07 percent and the total porosity determined by comparing true with apparent density was 1.2 percent. The coefficient of expansion was $30.10^{-7}$. Its resistivity was 0.6 ohm/sq.cm./cm. Its heat diffusivity was $27 \times 10^{-3}$ m.$^2$/h. Its resistance to compression was 1024 kg./sq. cm., as compared to 400 kg./sq. cm. for graphite and 600 kg./sq. cm. for motor brushes. Its resistance to flexing was 800 kg./sq. cm., which compares favorably with 100 for graphite and 300 for motor brushes. The loss of weight by wear, under a pressure of 250 g./sq. cm. during 30 mn., was 13 C.mm./sq. cm.

As many apparently widely different embodiments of the present invention may be made without departing from the spirit and scope thereof, it is to be understood that the invention is not limited to the specific embodiments.

What is claimed is:

1. A batch mixture particularly adapted to the manufacture of composite objects consisting essentially of graphite and glass, the graphite being a powder having particles less than about 50 mu. in size and the glass being a powder having particles less than about 30 mu. in size, the graphite being present from about 10 to 75 percent by volume of the glass and graphite, the glass having a viscosity less than $10^4$ poises at 700° C. in which a drop of said glass when molten and at rest on a smooth and horizontal graphite plate has planes tangent to its surface at the circumference of contact of said surface with the superior horizontal plane of the plate making with said horizontal plane an angle interior less than 45°.

2. A batch mixture particularly adapted to the manufacture of composite objects consisting essentially of graphite and glass, the graphite being a powder having particles less than about 50 mu. in size and the glass being a powder having particles less than about 30 mu. in size, the graphite being present from about 10 to 75 percent by volume of the glass and graphite, the glass having a viscosity less than $10^4$ poises at 700° C. in which a drop of said glass when molten and at rest on a smooth and horizontal graphite plate has planes tangent to its surface at the circumference of contact of said surface with the superior horizontal plane of the plate making with said horizontal plane an angle interior less than 15°.

3. A glass-graphite object consisting in its essential elements of particles of graphite less than 50 mu. in size, embedded in a matrix of glass, the glass in the piece being between 90 and 25 parts by volume and the graphite being respectively between 10 and 75 parts by volume, the glass having a viscosity below $10^4$ poises at 700° C., and having an interior contact angle with a flat graphite surface, when molten, less than 45°.

4. A glass-graphite object according to claim 3 in which the contact angle of the molten glass on a flat graphite surface is less than about 15°.

5. A method of making machinable, electrically conductive, glass-graphite objects which comprises mixing 10 to 75 parts by volume of graphite with 90 to 25 parts by volume respectively of finely divided glass, the graphite being in particles less than 50 mu. in size, the glass having a viscosity below $10^4$ poises at 700° C., and having an interior contact angle with a flat graphite surface, when molten, less than 45°, shaping the mixture under pressure at room temperature, molding it at agglomerating temperature under pressure, and cooling the molded object under pressure to a point below the temperature corresponding to the maximum point reached on the complete thermal expansion curve of the glass.

6. A method of making machinable glass-graphite objects which comprises mixing 10 to 75 parts by volume of graphite with 90 to 25 parts by volume respectively of finely divided glass, the graphite being in particles less than 50 mu. in size, the glass having a viscosity less than $10^4$ poises at 700° C., and having an interior contact angle with a flat graphite surface, when molten, less than 45°, shaping the mixture at agglomerating temperature, and cooling the object.

* * * * *